No. 772,812. PATENTED OCT. 18, 1904.
T. MIDGLEY.
METALLIC VEHICLE WHEEL.
APPLICATION FILED AUG. 21, 1903. RENEWED APR. 13, 1904.
NO MODEL.

Witnesses:
F. L. Orwand.
W. Parker Reinohl.

Inventor
Thomas Midgley.
By his Attorney
D. J. Reinohl.

No. 772,812. Patented October 18, 1904.

UNITED STATES PATENT OFFICE.

THOMAS MIDGLEY, OF COLUMBUS, OHIO, ASSIGNOR TO THE MIDGLEY MANUFACTURING COMPANY, OF COLUMBUS, OHIO, A CORPORATION OF OHIO.

METALLIC VEHICLE-WHEEL.

SPECIFICATION forming part of Letters Patent No. 772,812, dated October 18, 1904.

Application filed August 21, 1903. Renewed April 13, 1904. Serial No. 203,034. (No model.)

*To all whom it may concern:*

Be it known that I, THOMAS MIDGLEY, a citizen of the United States, residing at Columbus, in the county of Franklin and State of Ohio, have invented certain new and useful Improvements in Metallic Vehicle-Wheels; and I do hereby declare the following to be a full, clear, and exact description of the invention, such as will enable others skilled in the art to which it appertains to make and use the same.

My invention relates to vehicle-wheels, has especial reference to metallic wheels which in their manufacture are composed of sheet-metal rims and tubular spokes, which are joined together metallically by immersion into a body of liquid or molten brazing metal, and has for its object the strengthening of the connection between the outer ends of the spokes and the rim of the wheel.

The invention consists in certain improvements in construction which will be fully disclosed in the following specification and claims.

Figure 1:
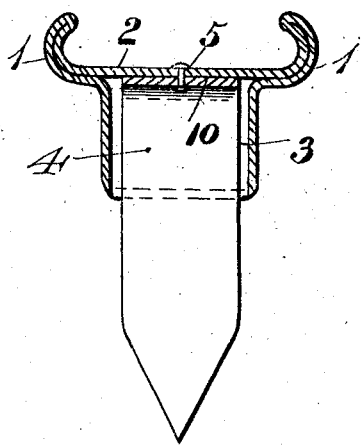
Figure 2:
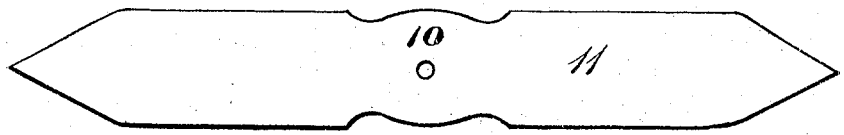
Figure 3:
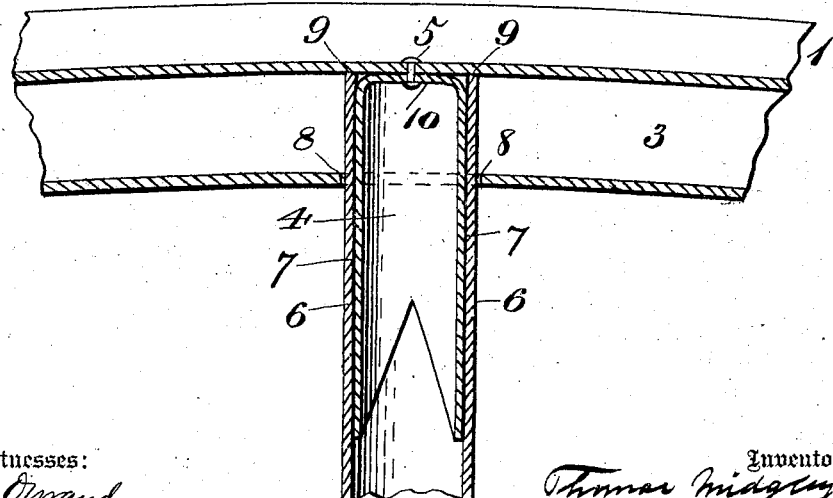

In the accompanying drawings, which form part of this specification, Figure 1 represents a transverse section of the rim of a wheel with a thimble secured thereto. Fig. 2 is a plan view of a blank for a thimble; and Fig. 3, a longitudinal section of part of a rim of a wheel, a spoke, and a thimble in position in the outer end of the spoke.

Reference being had to the drawings and the designating characters thereon, 1 indicates the rim of a wheel having a flat bearing or seat 2 for a tire (not shown) and a spoke-chamber 3, in which are tubular thimbles 4, only one of which is shown, attached to the inner side of the seat 2 by a rivet 5 to hold the thimble in position while a wheel is being assembled preparatory to brazing the parts together.

6 indicates a tubular metallic spoke whose outer end surrounds the thimble 4 in the spoke-chamber 3 and whose outer end extends to and abuts against the inner side of the seat 2, forming a long annular bearing 7 between the outside of the body of the thimble and the inside of the spoke and an annular bearing 8 between the spoke and the rim and the annular end bearing 9 between the spoke and the rim and which bearing-surfaces of the several parts are metallically joined by dipping or immersing the wheel in a bath of molten brazing metal, which joins the outer flat end 10 of the thimble 4 to the rim of the wheel. The spoke thus secured resists all jars to which the wheel is subjected in use and makes the connection between the spoke and the rim of the wheel strong and durable.

The blank 11, from which the thimble is made, is cut out of sheet-steel and bent into form by suitable dies.

Having thus fully described my invention, what I claim is—

1. A metallic vehicle-wheel rim, a tubular metallic spoke, and a metallic thimble at the outer end of the spoke and metallically joined thereto and to the rim.

2. A metallic vehicle-wheel rim, a tubular metallic spoke, and a metallic thimble metallically joined thereto and to the inner side of the tire-seat of the rim.

3. A metallic vehicle-wheel rim, a tubular metallic spoke, and a metallic thimble on the inside of the outer end of the spoke and metallically joined thereto and to the inner side of the tire-seat of the rim.

In testimony whereof I affix my signature in presence of two witnesses.

THOMAS MIDGLEY.

Witnesses:
 FRED MIDGLEY,
 FRED W. FLOWERS.